United States Patent [19]

Rzeszewski

[11] 4,296,433
[45] Oct. 20, 1981

[54] COLOR TELEVISION RECEIVING SYSTEM WITH FORCED CHROMA TRANSIENTS

[75] Inventor: Theodore S. Rzeszewski, Lombard, Ill.

[73] Assignee: Matsushita Electric Corporation of America, Franklin Park, Ill.

[21] Appl. No.: 151,360

[22] Filed: May 19, 1980

[51] Int. Cl.³ .......................................... H04N 9/535
[52] U.S. Cl. ........................................ 358/37; 358/166
[58] Field of Search ................... 358/37, 40, 162, 166

[56] References Cited

U.S. PATENT DOCUMENTS 3,623,126 11/1971 Newhouse ......................... 358/166
3,778,543 12/1973 Lowry ................................ 358/37
4,183,051 1/1980 Richman ........................ 358/37 X
4,245,239 1/1981 Richman ............................ 358/37

Primary Examiner—Robert L. Richardson
Attorney, Agent, or Firm—LaValle D. Ptak

[57] ABSTRACT

A system is used in conjunction with a color television receiver for forcing rapid chroma transients to be applied to the color picture tube in response to the sensing of transients in the chroma signal by establishing a predicted new signal level and applying such new signal level as an overriding signal to the input to the color picture tube for a predetermined time interval following the beginning of a sensed chroma transient.

9 Claims, 4 Drawing Figures

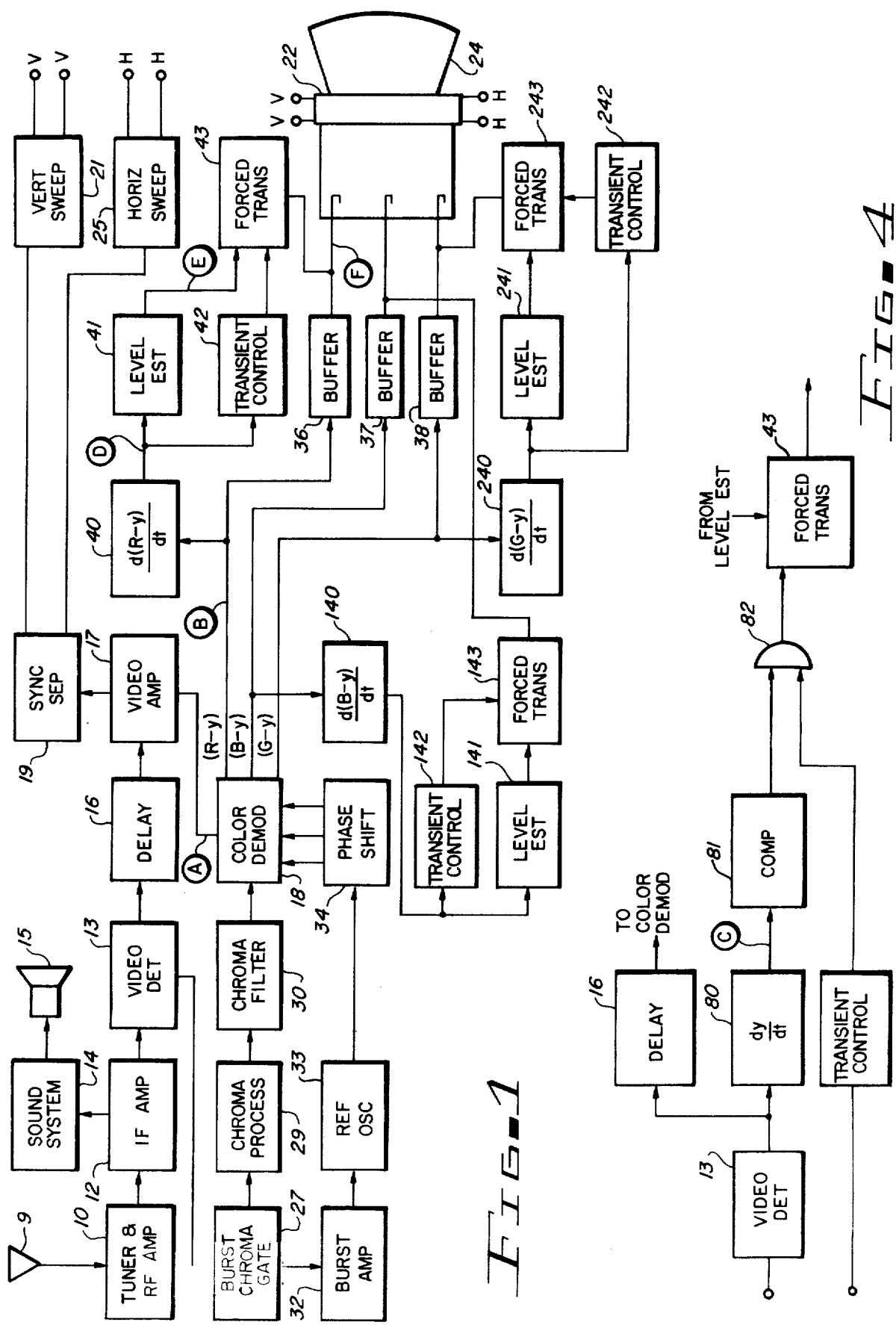

COLOR TELEVISION RECEIVING SYSTEM WITH FORCED CHROMA TRANSIENTS

BACKGROUND OF THE INVENTION

The standard NTSC color television signal currently used in the United States and variations of that signal in systems derived from it, such as the PAL and SECAM systems, are comprised of color information signal component, phase and amplitude demodulated on a color subcarrier to represent hue and saturation, respectively; a brightness signal component; a burst signal component, synchronized with the color information subcarrier; and synchronizing signal components. The brightness or luminance signal component is a relatively wide-band signal and it is typically a combination of three primary color signals which are used in the color signal component.

In color television receivers, separate channels to the demodulator are provided for the brightness and the color signal components. The color or chrominance signals typically are transmitted with a band-width that is considerably less than the band-with of the brightness or luminance components. In addition, in most receivers the band-with of the color signal components often is further limited. For example, in a typical NTSC-type transmission system the brightness component (Y) is transmitted and received in its full band-width, and linear combinations of the color or chrominance signals are transmitted in a reduced band-width. This means that the fidelity of the color portion of the received and reproduced signal is inferior to the fidelity of the monochrome or brightness portion of the signal. As observed on the picture tube, this results in a smearing effect in the transitions from one color to another or in transitions between regions of different intensity within a field of the same color (for example, the variations of intensity of red in the various parts of a red rose.

The three different color signals in the United States are generally designated as color difference signals, that is color signals with the brightness component removed; and these signals are the red, blue and green color difference signals, designated respectively as (R-Y), (B-Y), and (G-Y). These three signals are transmitted in linear combination as chrominance signals designated as the I chrominance signal and the Q chrominance signal. The signal format is well known. It has been used for a number of years and the I and Q signals define separate perpendicular chrominance axes. The I and Q signals, as transmitted, have different band-widths (the I signal being of wider band-width) and each of these band-widths is substantially narrower than that of the Y or brightness signal components. In the interests of reducing the costs of television receivers as much as possible, most conventional receivers use compromises from the ideal characteristics and accept and reproduce somewhat erroneous chrominance or color signal components. In the processing of the chroma signals, the high frequency color components are lost due to the band-width restrictions of the receivers.

The public has long accepted color television reception which exhibits visible color infidelities. While these may be identified technically as being caused by incorrect highs, polarity reversals, and the like, they are visible on the display screen of the television receiver in the form of blurred or smeared transitions, desaturation of colors, and the like. These errors can be summarized as resulting in a picture that lacks crispness or detail. Many of these errors simply result from a slow response time of the color processing portion of the television receiver to transients from one color to another or from different intensities within a single color, particularly in sharp transitions of any type. Because of the limitations in band-width, these color transitions are slower than the transitions in the brightness or luminance portion of the signal; so that a "soft" or somewhat blurred picture is reproduced.

Various attempts have been made in the prior art to produce a color television display that has more detail than conventional displays. One such approach is disclosed in the patents to Richman, U.S. Pat. No. 4,181,917, issued Jan. 1, 1980, and U.S. Pat. No. 4,183,051, issued Jan. 8, 1980. The Richman systems add a high frequency signal component derived from the luminance or brightness signal component to the chrominance signal components. The effect is to attempt to precisely replace a missing high frequency component that was lost due to band-width limiting of the chroma signals. Another patent utilizing a similar technique is the patent to Faroudja, U.S. Pat No. 4,030,121, issued June 14, 1977.

Another system which has been developed to improve the crispness of chroma signals is disclosed in the patent to Davidse, U.S. Pat. No. 3,333,059, issued July 25, 1967. Davidse employs double differentiation of the chrominance or color signal to develop a correction signal which is added to the luminance signal components. Thus, the system of this patent is similar in its approach to the systems disclosed in the Richman and Faroudja patents.

Another system, which also uses the luminance signals to correct or improve the color signal components is disclosed in the patent to Netravali, U.S. Pat. No. 4,141,034, issued Feb. 20, 1979. The Netravali patent is directed to a system where the luminance or brightness signal transitions in a color video digital encoding system are used to predict the presence of similar transitions in the color component. This information then is used in the system to improve the color reproduction. Two other patents which operate on the color signal to alter the reproduced image are the patents to Nagaoka, U.S. Pat. No. 3,835,243, issued Sept. 10, 1974, and Keiper, U.S. Pat. No. 3,242,259, issued Mar. 22, 1966. Both of these patents detect the strength of the color signal and reduce the gain of the chroma channel under certain circumstances in an effort to improve the reproduced image.

The systems disclosed in these various patents, while capable of producing improvements in the details of the reproduced color television picture, require relatively complex additions to the television receiver. These additions result in increased manufacturing costs and introduce additional areas of factory and set-up adjustments to optimize the receiver performance. Accordingly, it is desirable to provide a system for color television receivers which is simpler than the systems mentioned above and which causes the reproduction of a picture on the screen of a color television receiver that appears to the viewer to have more detail than is presently available from conventional television receivers. In addition, it is desirable to accomplish this improvement of the reproduced image of a color television receiver without degrading the monochrome image or the reproduced color image quality in other respects.

SUMMARY OF THE INVENTION

Accordingly, it is an object of this invention to provide a system for improving the picture of a color television receiver.

It is another object of this invention to provide a system for improving te transient response of a color television receiver.

It is an additional object of this invention to provide system for a color television receiver to improve the transient response of the color processing circuitry of the receiver to obtain crisper color transitions in the reproduced picture.

It is a further object of this invention to improve the detail of the reproduced image of a color television receiver.

It is a more specific object of this invention to provide a system for producing forced transients in chroma processing circuits of a television receiver.

It is yet another object of this invention to provide a system for forcing rapid transients in the chroma signals of a television receiver to improve the color detail of a reproduced image in a television receiver.

In accordance with a preferred embodiment of this invention, a color television receiver including color processing circuits for producing demodulated color signals to be applied to a color picture tube has a system added to it for improving the transient response of the receiver to changes in the color signals. This system includes a circuit for sensing changes in the level of each of the color signals to produce an output which is indicative of each of these signal level changes. A threshold circuit is coupled with the sensing circuit to produce an output signal when the signal level from the sensing circuit exceeds some preestablished threshold. A control circuit is connected to the sensing circuit and the threshold circuit to force the signal level applied to the color picture tube for the different color signals to rapidly attain a level proportional to the output of the sensing circuit, irrespective of the signal level which otherwise would be applied to the color picture tube by the standard color processing circuitry of the receiver.

In a more specific embodiment, each of the outputs of the demodulator circuit of the television receiver has a separate sensing circuit, threshold circuit and control circuit connected to it to sense the changes in level of that one corrresponding color output signal, and to operate by way of the control circuit corresponding to that color to force the signal level applied to the color picture tube for that color to be varied in accordance with the operation of the control circuit uniquely associated with that particular color.

BRIEF DESCRIPTION OF THE DRAWINGS

FIG. 1 is a block diagram of a television receiver incorporating a preferred embodiment of the invention;

FIG. 4 is a block diagram of a portion of a circuit which may be employed in conjunction with the circuits shown in the embodiment of FIG. 1 to modify the operation of the circuit of FIG. 1.

DETAILED DESCRIPTION

Figure 3:
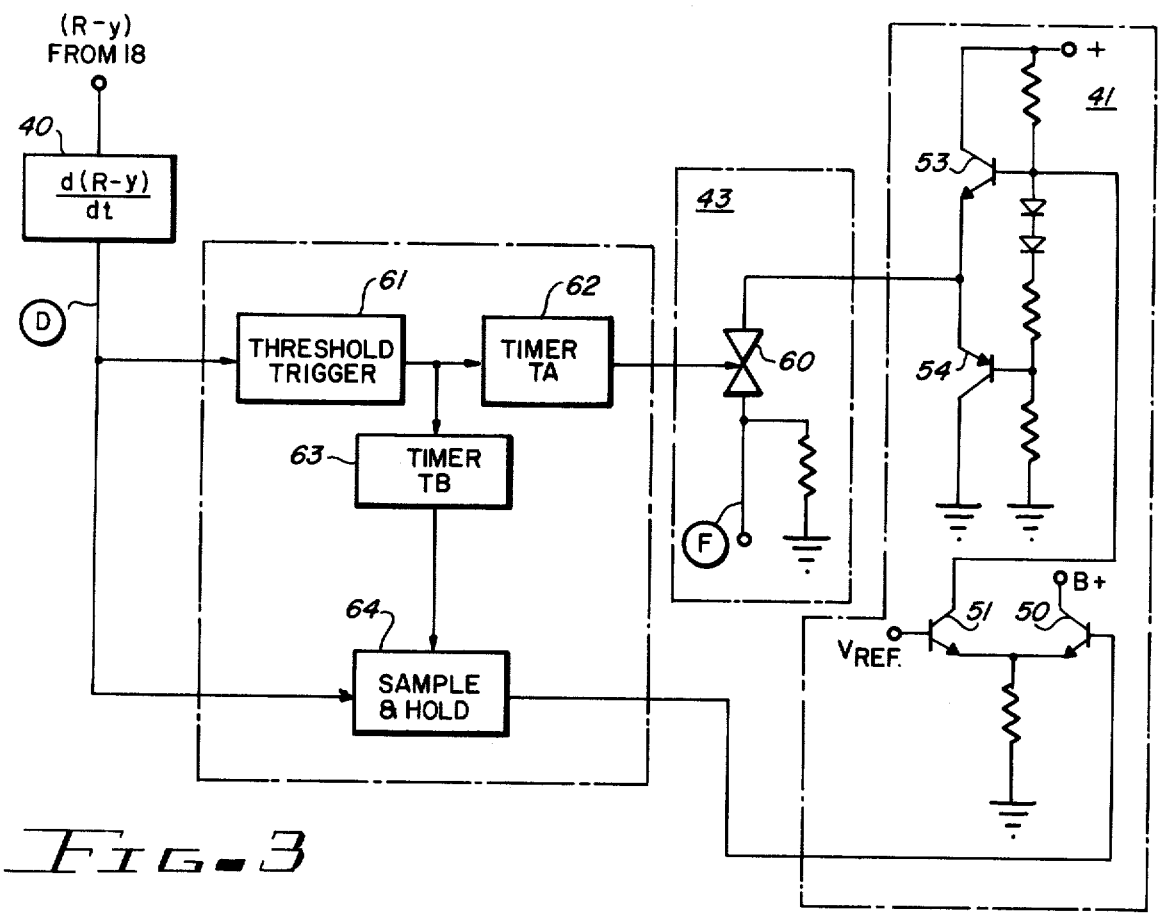
FIG. 3 is a detailed circuit diagram of portions of the circuit which may be used in the embodiment shown in FIG. 1.

Reference now should be made to the drawings in which the same or similar reference numbers are used throughout the different figures to designate the same or similar components.

In FIG. 1 there is shown a color television receiver including an antenna 9 supplying input signals to a tuner and RF amplifier stage 10, which receives and converts the incoming television signals to an intermediate frequency signal. The tuner 10 includes, by way of example, RF stages of the receiver as well as a first detector or mixer and an associated local oscillator. The output intermediate frequency developed by the tuner and RF amplifier stage 10 is coupled through an intermediate frequency amplifier 12 to a video detector 13. The output of the intermediate frequency amplifier 12 also is supplied to a sound system 14 which supplies amplified audio signals to a loudspeaker 15. Brightness signal components in the detected composite video signal are delayed in a delay circit 16, for purposes well known to those skilled in the art, and are applied to a video amplifier 17, the output of which is supplied to a color demodulator circuit 18.

The composite signal provided by the video amplifier 17 has video information components with a blanking interval recurring at the horizontal rate of 15,734 Hz. A horizontal synchronizing pulse appears at the beginning of each blanking interval immediately followed by a burst signal component. A vertical synchronizing pulse also appears in the composite video signal at a 60 Hz rate and is separated from the remainder of the composite signal in a synchronizing pulse separator circuit 19. The separated vertical synchronizing pulses then are applied to a vertical sweep system 21 which develops a vertical saw-tooth sweep signal V-V in vertical deflection windings placed on a deflection yoke 22 on the neck of a cathode ray tube 24 for vertically deflecting the electron beams in the cathode ray tube 24.

The horizontal synchronizing pulses also are separated from the remainder of the composite signal in the pulse separator circuit 19 and are applied to a horizontal sweep system 25 which develops horizontal sweep signals H-H in horizontal deflection windings on the deflection yoke 22 for horizontally deflecting the electron beams in the cathode ray tube 24.

In a color television receiver, the composite signal obtained from the video detector 13 also is supplied to a burst-chroma gate 27 which causes the color subcarrier components to be applied to a chroma processing circuit or chroma amplifier circuit 29, the output of which then is supplied through a chroma filter 30 to the input of the color demodulator 18 for demodulation by the demodulator. Although the circuit interconnection has not been shown in FIG. 1 for the purposes of clarity, the gate 27 is controlled by fly-back pulses obtained from the horizontal sweep system 25; and each time that a horizontal fly-back is applied to the gate 27, the input signals obtained from the video detector 13 are diverted to a burst amplifier 32. Since the fly-back pulses occur during the time that the burst component of the composite color television signal is present, the output of the burst amplifier 32 is in the form of amplified alternating current signals at the burst frequency only. These signals are applied to a synchronization input terminal of a reference oscillator 3 to synchronize the operation of the oscillator 33 with the burst components of the received signal. Thus, the output of the reference oscillator, at the color subcarrier frequency, is supplied at the desired phase relative to the burst component of the composite signal to the input of a phase shifting circuit 34. The circuit 34 then produces the three phases of color reference signals to the color demodulator circuit 18 which directly produces the red, blue and green color signals (normally referred to as color difference signals) needed to drive the cathodes of the color cathode ray tube 24. These color difference signals are indicated in FIG. 1 on the outputs of the color demodulator 18 as (R-Y), (B-Y), and (G-Y), respectively.

As shown in FIG. 1, these three respective outputs are connected to corresponding ones of the three cathodes of the color picture tube 24 through three buffer amplifier circuits 36, 37 and 38, respectively, and driver stages that are not shown. With the exception of the amplifiers 36, 37 and 38, the system which has been described thus far is a conventional color television receiver. Various types of circuits for performing the individual functions identified within the blocks are used by different manufacturers, but these circuits are conventional and will not be described here.

Added to the otherwise standard color television receiver circuit shown in FIG. 1 is the circuitry of a preferred embodiment of this invention to sharpen the transients between different color or different intensities within the same color; so that the reproduced picture on the picture tube 24 has enhanced color transition detail in it. To accomplish this, it has been found that it is necessary to detect the start of a color transient, then the direction of that transient, its magnitude, and the time duration of the transient. With this information, it is possible to override or accelerate the change in the magnitude of the signal applied to the cathode of the picture tube 24 corresponding to that particular color to force a rapid transient in that signal.

Figure 2:
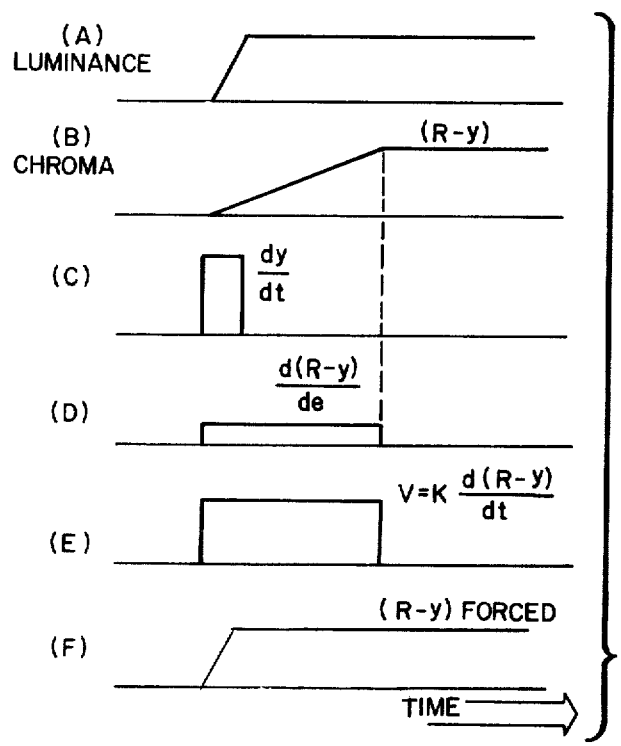
FIG. 2 illustrates waveforms useful in explaining the operation of the circuit shown in FIG. 1.

Ordinarily, the color transient is relatively slow, because of the more limited band-width, then the transient in the luminance or brightness signal. For example, reference should be made to waveforms A and B of FIG. 2, which illustrate the luminance and chroma transients, respectively, which take place for a transition from one color to another in a reproduced picture. As can be seen from an examination of the slope of waveforms A and B during the transient, the luminance signal attains its new level in a considerably shorter period of time than the chroma signal. This results in a smearing or blurring of the color at the border between two different colors or in the intensity variations where the transition represents a change in intensity of the same color.

The circuit components which have been added to the television receiver of FIG. 1 are for the purpose of detecting the beginning of a color transient and then forcing a predicted chroma level signal on the cathode of the picture tube 24 corresponding to that signal, even though the output of the color demodulator 18 for that color is undergoing a relatively slow transient to its new level. Detection of the start of the transient, consequently, is most important because initially a decision must be made as to whether or not there is a transient in existence; so that the system can force a rapid transient to place a new input signal level on the cathode correspoinding to the color undergoing the transient as rapidly as possible. Obviously, it would be unacceptable to force a transient at a time when there was no transient in the particular color of the original screen being reproduced by the television receiver.

The implementation of a forced transient control in accordance with the preferred embodiment of the invention may be effected in any one of the following three different ways:

(1) When the change in the color signal (C-Y) or the derivatives of the color signal exceeds a certain threshold, that is, $$\frac{d(C-Y)}{dt} > K1,$$

where C is the chroma signal (I or Q or red, green or blue) and Y is luminance, and K1 is a constant.

(2) When $$\frac{d(C-Y)}{dt} > K1$$

and the derivative of or change in luminance exceeds a certain threshold, that is, $dy/dt > K2$ (where K2 is a constant).

(3) Or when $$\frac{d(C-Y)}{dt} / \frac{dy}{dt} > K3,$$

where K3 is a constant.

As representative of these approaches, the circuit of FIG. 1 is based on example 1. The rest of the description of FIG. 1 is made in conjunction with the waveforms of FIG. 2, and the letters identifying each of these waveforms are indicated in FIG. 1 for the demodulated "red" color signal (R-Y). It is to be understood that a similar circuit is provided for each of the other two outputs of the color demodulator 18, and that the circuits connected to each of these outputs for providing forced transient signals are identical to one another and operate in an identical manner. The only difference is that each of the circuits is supplied with a demodulator color signal for a different one of the three different colors, namely red, blue and green.

Assume, for purposes of illustration, that a transient from some other color (not including any red components) to the red color difference signal takes place and that this transient is a step transient or an abrupt color shift (such as would occur when the camera scans from blue sky to a red fire engine). This results in an abrupt signal transition from essentially zero to some finite level in the (R-Y) output of the color demodulator 18. Because of the band-width limitations, however, this rise is not a step function but, instead, follows the slope of waveform B of FIG. 2 from time zero to time t3. For ideal crisp, sharp, picture reproduction, however, the transition should be a step function. Consequently, for a normal color television receiver, there is smearing at this transition, or a softness or blurring effect as it is variously described. At the same time, because of the wider band-width of the luminance signal, the time required for the luminance transition is much shorter, as is illustrated in waveform A of FIG. 2.

The R-Y output of the color demodulator 18 is applied to the input of a differentiating circuit 40, which provides an output indicative of the rate of change of the R-Y chrominance signal. The circuit 40 is used to detect the initiation of a transition in the R-Y color output of the demodulator 18, and the signal level on the output of the differentiating circuit 40 has a magnitude and sign which is indicative of the rate of change and the direction of that change in the R-Y color output signal. The output of the differentiating circuit 40 then is applied in parallel to two circuits, a level estimating circuit 41 and a transient control circuit 42. The transient control circuit 42 is for the purpose of preventing the generation of any forced transients in the color signal applied to the R-Y cathode of the picture tube 24 for slow changing transitions.

The level of the transient control 42 is set to cause an "on" switching output signal to be obtained from it whenever a rate or change in excess of the preestablished threshold of this circuit is exceeded. At the same time, the rate of change of the signal obtained from the output of the differentiating circuit 40 is applied to the level estimating circuit 41, which produces a signal level that may be different from the signal level on the R-Y output of the color demodulator 18, the magnitude of which is determind by the signal level output of the differentiating circuit 40.

The forced transient control circuit 43 operates essentially as an analog gate (a transmission gate is used to illustate its operation), which passes the output of the level estiminating circuit 41 (waveform E of FIG. 2) through to its output when it is switched on by the transient control circuit 42, any time the output of the transient control circuit 42 is in its "on" state. Whenever the transient control circuit 42 is in its "off" state, the forced transient circuit 43 is off and does not have any affect on the signal applied to the "red" cathode of the picture tube 24. When the forced transient control circuit 43, however, is operative, the output of the forced transient control ciruit 43 forces the magnitude of the signal placed on the cathode of the picture tube 24 to be greater than (or less than) the signal which otherwise would be applied to that cathode from the output of the color demodulator 18. This is indicated in waveform E of FIG. 2. All of the timing parameters of the system may be selected effectively to cause the relatively steady state output of the color demodulator 18 to be attained at the time the forced transient circuit has ceased operation. By providing a slight overshoot, enhanced sharpness or crispness at the color transient line or point, as displayed on the picture tube screen, takes place. It is not necessary, however, to provide for a overshoot and the system may simply produce a forced transient waveform with a faster rise time than the normal rise time of the demoudulated chroma output signal as illustrated in waveform F of FIG. 2. Various techniques are known which can result in the desired operation.

Similar circuits are provided for the blue and the green color difference signals obtained from the corresponding outputs of the color demodulator 18. The circuits for producing these results for these other two colors are illustrated with the same reference numbers 40 through 43 are used in conjunction with the R-Y color signal, but with "100" and "200" prefixes, respectively. In all other respects, the circuit operation is identical for each of the three different color signals and these different forced transient circuits all operate in the same manner but independently of one another, to control the transients for the individual colors with which they are associated.

Reference should now be made to FIG. 3, which shows details of a portion of the preferred embodiment illustrated in FIG. 1. The level estimator circuit 41 is shown as comprised of a differential amplifier consisting of a pair of transistors 50 and 51, the bases of which are supplied with the output signal from the differentiating circuit 40 as sampled by 64 and a reference voltage, respectively. The collector of the transistor 51 comprises the output of the differential amplifier, which is applied through an emitter follower amplifier stage 53 to supply the estimated level voltage as an operating voltage to a forced transient control circuit 43. The voltage on the emitter of the emitter follower amplifier 53 varies in accordance with the level of the voltage applied to the base of the transistor 50 of the differential amplifier in the level estimator circuit 41; so that this voltage is proportional to the output of the differentiating circuit 40. Transistor 54 helps insure that the node E does not allow any voltage change as a result of signals that the buffer amplifier 36 is trying to force at node F.

The transient control circuit 43 simply consists of an analog gate (switch) 60 that may be a transmission gate or some other appropriate device which shorts the nodes E and F together when it is activated (turned on). It provides effective isolation between these two nodes when it is not activated. The transient control circuit 42 consists of a threshold trigger 61 that is activated when the derivative of (R-Y) exceeds an established level. When this happens, the trigger 61 activates two timers 62 and 63 into operation. The timer 62 activates the gate 60 to effect a forced transient for a period of time $T_A$. The timer 63 activates a sample and hold circuit 4 for a slightly longer time period $T_B$. As a result, the transient control circuit 42 causes the level estimator 41 to make an estimate of the new chroma level based on the initial sample of the circuit 40 for a time period of at last $T_B$. Meanwhile, the circuit 43 is forcing this new level at the node F for a time period $T_A$, i.e., forcing the chroma level at node F to the estimated level of node E. Alternatively, the operation of the hold control of the circuits 41 and 42, and control of the circuit 43, may be terminated when the derivative of (R-Y) falls below a predetermined level.

Reference now should be made to the circuit of FIG. 4, which illustates a variation of the system which may be employed in conjunction with the portion described above. In the circuit of FIG. 4, the luminance component of the signal appearing on the output of the video detector 13 is differentiated by a differentiating circuit 80 to produce the signal shown by waveform C of FIG. 2 on its output. A comparator circuit 81 is supplied with this input; and if the signal "C" exceeds a preestablished threshold, an enabling is obtained from the output of the comparator 81. For slow changing luminance variations no output of the comparator 81 is obtained. The comparator output is applied as an enabling input to a conicidence gate 82, the other input is obtained from the output of the transient control circuit 42.

Whenever the luminance signal indicates a transition in the luminance which coincides with outputs from the transient control 42, the forced transient circuit 43 is enabled with the system of FIG. 4. If variations in the color signal occur without transients in the luminance signal, however, no output is obtained from the forced transient circuit 43. Thus, the circuit of FIG. 4 limits the forced transient circuit operation to only those situations where there is a rapid or abrupt change in luminance coincident with a similar change in color. Such changes occur when the picture content changes from one color to another, but the circuit of FIG. 4 would not be enabled for variations in color content not accompanied by a sharp transition in the luminance signal.

The foregoing description has been made in conjunction with a disclosure of the preferred embodiment utilizing the first derivative of the color difference signal as the controlling input signal to make a determination as to whether or not a forced transient should be made and for controlling the level estimating circuit 41 to establish the new level which is to be forced. As stated previously, however, the system operation may be effected in any one of three ways, only one of which has been described in detail in conjunction with the various figures of the drawing.

Instead of using a first derivative of the color difference signal in the circuits 40, 140 and 240, the color demodulator outputs also could be used directly without differentiation, if desired. In such a situation, the level estimating circuit 41 and the transient control circuit 42 could be provided with a reference signal corresponding to the previous level on the color demodulator output with which they are associated; so that when a change in excess of some preestablished amount occurs, the forced transient circuit 43 would be operated to reflect such a change. The utilization of the differentiation of this change to provide an output representative of the rate of change, as shown in FIG. 1, is preferred; but those skilled in the art may wish to implement the system techniques without utilizing differentiation of the color difference signal output from the color demodulator 18.

The version shown in FIG. 4 is representative of a system where the forced transient only is permitted to take place when there is a corresponding simulataneous change in the luminance signal. As illustrated in FIG. 4, this is accomplished by means of a coincidence gating arrangement, but other circuit configurations using this same information can be used, if desired.

The system which is shown in the embodiments illustrated in the various figures of the drawings and described above is to be considered as illustrative of the invention and not as limiting. Various changes will occur to those skilled in the art without departing from the true scope of the invention. The system is one which requires relatively little additional circuitry within a television receiver to accomplish a signficantly observable improvement in the fidelity or crispness of the displayed color television picture on the picture tube 24.

I claim:

1. In a television receiver including processing circuits producing signals for application to a picture tube, a system for improving transient response, including in combination:

sensing means coupled with the processing circuits of the television receiver for sensing changes in the level of a signal and providing an output indicative thereof;

second means coupled with the output of said sensing means for producing an output signal when a predetermined output signal level is obtained from said sensing means; and control circuit means coupled with said sensing means and said second means for forcing the signal level applied to the picture tube to a predetermined signal level proprotional to the output of said sensing means irrespective of the level of the signal applied to the picture tube by the processing circuits.

2. The combination according to claim 1 wherein the television receiver is a color television receiver, the processing circuits produce demodulated color signals for application to a color picture tube, and said system is for improving color transient response; and wherein said control circuit means forces said predetermined signal level for a predetermined period of time.

3. The combination according to claim 2 wherein said control circuit means is switched into operation by said second means whenever said predetermined output signal level is obtained from said sensing means and wherein said control circuit means is ineffective to affect the signal level applied to the color picture tube by the color processing circuits at all other times.

4. The combination according to claim 2 wherein said sensing means comprises means for providing an output signal corresponding to the time derivative of the color difference signal $$\frac{d(C-Y)}{dt},$$

where C represents the color component and Y represents the luminance component for a composite television signal.

5. The combination according to claim 4 wherein said second means is operated to produce an output signal whenever the rate of change of the color signal sensed by said sensing means exceeds a predetermined amount.

6. The combination according to claim 2 wherein the color processing circuits of the television receiver comprise at least two circuits producing color difference signals and wherein a sesing means, a second means, and a control circuit means are provided for each of said color processing circuits, producing corresponding independent controls of the signal levels applied to the color picture tube for each of said different color difference signals.

7. The combination according to claim 6 wherein the color rocessing circutis of the television receiver produce three different color difference signals on three different outputs, namely (R-Y), (B-Y), and (G-Y), where R, B and G represent respectively, the red, blue and green color signals, and Y represents the luminance signal component of the composite color television signal, and each of such three outputs of the color processing circuits of the television receiver has a corresponding separate sensing means, second means, and control circuit means interconnected for independently forcing the signal level applied to the color picture tube for each of the three different color difference signals.

8. The combination according to claim 2 further wherein the color television receiver has a luminance processing circuit therein, and said system furher includes an additional sensing means coupled with the luminance processing circuit of the receiver for sensing changes in the level of the luminance signal component and providing an output indicative thereof; an additional second means coupled with the output of said additional sensing means for producing an output when a predetermined output level is obtained from said additional sensing means; and coincidence circuit means coupled with the outputs of both of said second means providing an output for enabling said control circuit means only when predetermined output conditions exist from both of said second means.

9. The combination according to claim 8 wherein said additional sensing means comprise a means for providing an output indicative of the rate of change of the level of the luminance signal component, and the output of the sensing means coupled with the color processing circuits comprises means for sensing the rate of change of level in the color signal.

* * * * *